Figure 1:
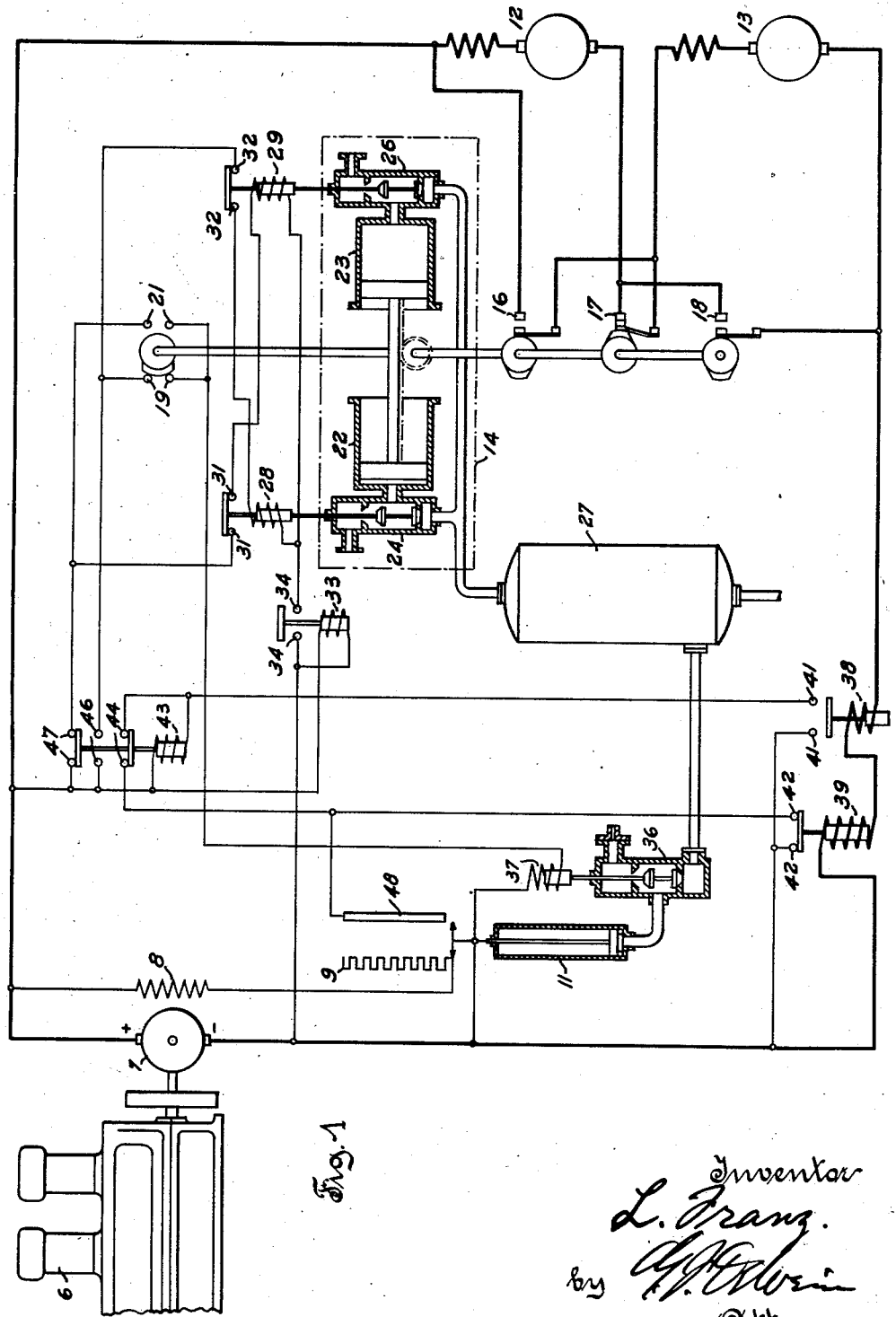

Patented Oct. 6, 1936

2,056,783

UNITED STATES PATENT OFFICE 2,056,783

MOTOR CONTROL SYSTEM

Leo Franz, Wien, Austria, assignor to Aktiengesellschaft Brown Boveri & Cie., Baden, Switzerland (a joint-stock company of Switzerland)

Application July 27, 1932, Serial No. 625,045
In Austria July 27, 1931

7 Claims. (Cl. 172—179)

This invention relates to improvements in motor control systems and more specifically to the control of the connections of a plurality of motors arranged for different connections with a source of current.

In electrically driven vehicles, for example, when such vehicles are supplied at constant voltage from a trolley line or from a battery carried by the vehicle it is usual to provide several traction motors which may be connected in series, in parallel or in series-parallel for starting and for variable speed operation of the vehicle with a minimum of energy loss in resistances inserted in the motor circuit. In vehicles supplied at variable voltage from a generator driven by a prime mover mounted on the vehicle, similar connections of the motors permit reduction in the size of the generator required. The advantages of such connections will appear from the fact that, if $n$ traction motors are connected permanently in parallel in a vehicle supplied at constant voltage, the supply voltage will be that of each motor when the several motors are running at high speed, low current and low tractive effort. At low speeds and high tractive effort the current drawn from the source will be $n$ times the rated motor current. Upon reconnecting the motors in series at low speed the current drawn from the source is reduced to the motor rated current. The changeover of the motor connections from series to parallel and vice versa can be effected by hand which requires the attention of the operator of the vehicle or other motor driven devices and such changeover is not always obtained at the proper time for the purpose of reducing the transient currents drawn from the source and the accelerations of the vehicle to a minimum. Automatic changeover operation will relieve the operator of the above duty and will give a smoother changeover by avoiding the drawing of excessive currents from the source and avoiding excessive accelerations of the vehicle.

It is accordingly an object of the present invention to provide a motor control system in which the connections between the several motors and the current source are automatically controlled.

Another purpose of the present invention is to provide a motor control system in which the connections of the motors with the current source from parallel to series-parallel or to series and vice versa are controlled automatically.

Another purpose of the present invention is to provide a control system particularly for electrically operated vehicles for automatically changing the operating connections of the traction motors of the vehicle in response to the current drawn by the motors from the source.

Another purpose of the present invention is to provide a control system for electrically operated vehicles for automatically changing connections of the traction motors of the vehicle in response to current drawn from the source by one of the motors.

Another purpose of the present invention is to provide a control system for electric vehicles for automatically changing connections of the traction motors of the vehicle in response to the tractive effort of the motors.

Another purpose of the present invention is to provide a control system for electric vehicles for automatically changing connections of the traction motors in response to the speed of the vehicle or the traction motors.

Another purpose of the present invention is to provide a control system for electric vehicles for automatically changing connections of the traction motors without drawing excessive transient currents from the source at the time of changeover of the motor connections.

Another purpose of the present invention is to provide a control system for electric vehicles for automatically changing connections of the traction motors without imparting excessive accelerations to the vehicle.

Objects and advantages other than those set forth will be apparent from the following description when read in connection with the accompanying drawings, in which:

Fig. 1 diagrammatically illustrates one embodiment of the invention as applied to the control of an electric vehicle propelled by a plurality of electric motors supplied with variable voltage from a generator driven by a prime mover mounted upon the vehicle.

Figure 2:
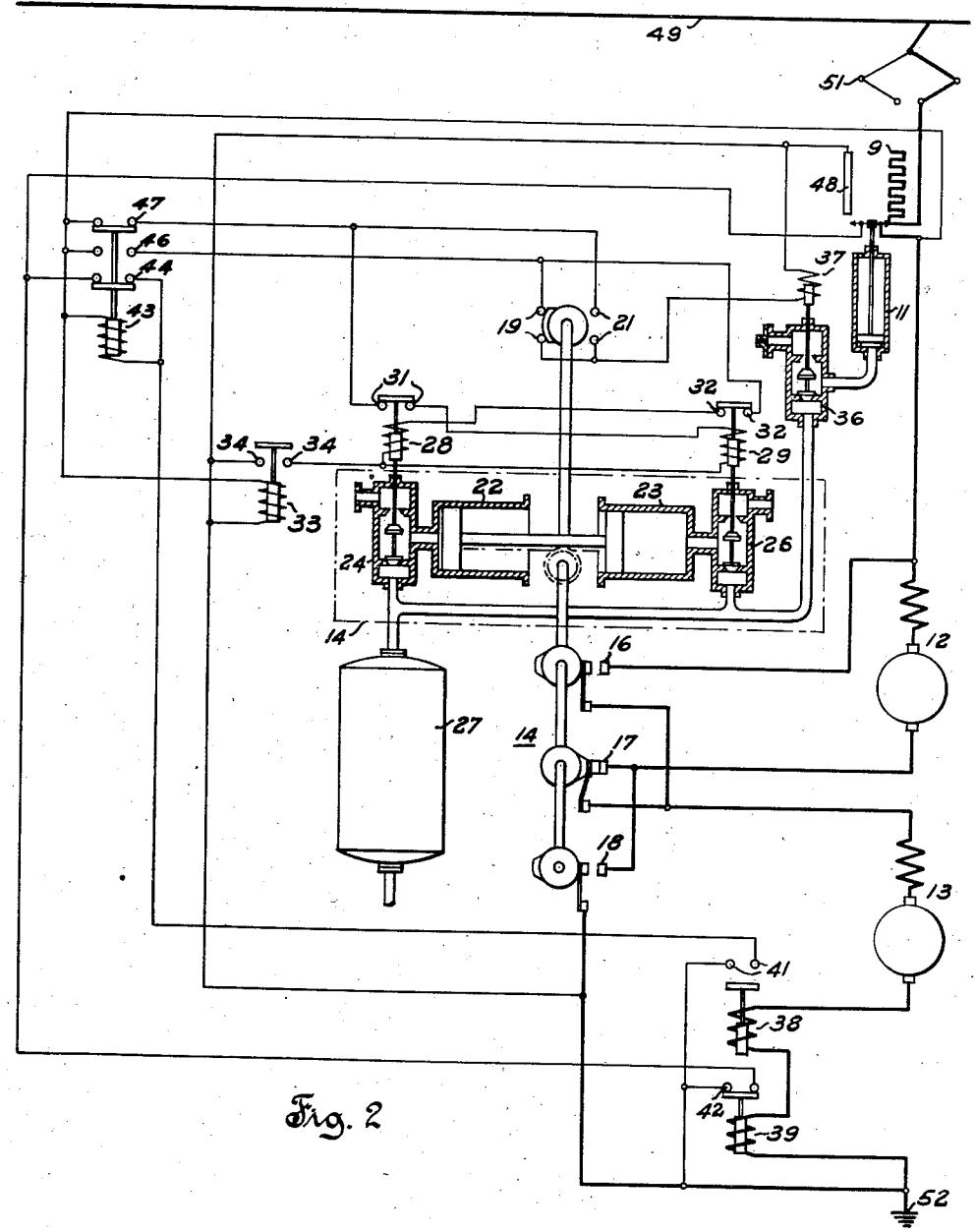

Fig. 2 diagrammatically illustrates another embodiment of the invention as applied to an electric vehicle propelled by a plurality of electric motors supplied at constant voltage from a trolley line or from a battery.

Referring more particularly to the drawings, the reference numeral 6 designates a prime mover which may be of the internal combustion type provided with the usual starting and control means (not shown). Prime mover 6 drives a genator 7, 8 provided with suitable means (not shown) for maintaining the output thereof at a constant value independently of the speed of traction motors connected with the generator or the tractive effort thereof unless affected by means described below. The current in the field winding 8 of the generator is controlled by rheostat 9 operated by pneumatic means 11 to reduce the excitation of the generator and reduce the output voltage thereof to a low value, the effect of rheostat 9 prevailing over that of the usual means referred to above. The several traction motors of the vehicle are shown at 12 and 13 and are connected with the generator by cam operated contactors 16, 17 and 18 which are operated by a pneumatic drive generally designated at 14. Due to the fact that the vehicle, in the embodiment shown, is provided with only two motors no series-parallel connections are possible and the controller takes only two different positions corresponding to the series and to the parallel connection of the motors respectively. The contactors are provided with auxiliary contacts 19 and 21, the purpose of which will appear hereinafter. The drive 14 comprises two pneumatically operated cylinders 22 or 23 controlled by two valves 24 or 26 supplied with operating fluid under pressure from a reservoir 27. The valves are operated by solenoids 28 or 29 provided with auxiliary contacts 31 or 32. The operation of the valves is controlled by a voltage relay 33 provided with contacts 34 which permit operation of solenoids 28 or 29 only when the voltage of the generator 7, 8 has been reduced to a predetermined value by insertion of rheostat 9 in the circuit of field 8 upon operation of the drive 11 which is controlled by a valve 36 operated by a solenoid 37. The control of valve 36 is such that drive 11 is supplied with fluid under pressure from reservoir 27 upon energization of solenoid 37. Upon deenergization of the solenoid 37 the fluid in drive 11 is expelled through valve 36 through an adjustable exhaust port so as to permit the return of drive 11 into the position shown in a predetermined length of time.

The operation of the system is initiated by one of two relays 38 or 39 provided with contacts 41 and 42 respectively. Relays 38 and 39 operate in response to the current delivered by the generator, which current is a function both of the tractive effort of the traction motors and of the speed thereof, such functions being dependent on the particular connection of the motors at the instant considered. The relays, therefore, respond to tractive effort, and speed, as well as current. To operate the changeover from series to parallel and from parallel to series connection of the motors at the same value of tractive effort which would be one-half of the rated tractive effort of the motors, both relays 38 and 39 should be adjusted to operate at generator currents corresponding to identical values of current in each motor under the above conditions. Relay 38 is designed to operate when the motors are in series and therefore when the generator current reaches rated motor current I, and relay 39 is designed to operate when the motors are in parallel and therefore when the generator current reaches one-half rated motor current $$\frac{I}{2}$$

With such adjustment the best utilization of the equipment will be obtained but the vehicle may run for a period of time at substantially one-half its maximum tractive effort in which case the control system may produce an undesirable succession of changeover operations. Such repetition operations can be avoided by adjusting relays 38, 39 to operate at respectively 1.1 I and 0.45 I which gives a range of tractive effort over which either connection of the motors is possible. The equipment also includes a changeover relay 43 provided with contacts 44, 46, 47. Pneumatic drive 11 controls a switch 48 which is closed for any position of the drive outside of its lowest position.

In operation, the vehicle being considered at rest, motors 12 and 13 are connected in series, prime mover 6 is started by the usual means and generator 7, 8 is excited so as to energize motors 12 and 13. In the usual vehicles the starting current is considerably larger than the rated currents of the motors so that relay 38 closes contacts 41 thereby energizing relay 43. After starting, the motor current decreases and relay 38 opens its contacts but relay 43 remains energized over its holding contacts 44 and over contacts 42 of relay 39. The connections of the system are then as shown in the drawings and remain in the condition shown as long as the generator current remains above .45 I. As the vehicle accelerates, the current given by the generator decreases and may fall below the value of 0.45 I. Relay 39 then operates to open contacts 42 thereby deenergizing relay 43 which closes its contacts 46. A current then flows from generator armature 7 through contacts 46, contacts 19 and solenoid 37 which operates valve 36 to admit fluid to the drive 11 thereby inserting rheostat 9 in the circuit of generator field 8 and reducing the voltage of the generator. Relay 33 is no longer sufficiently energized to remain in the position shown and closes contacts 34. A current then flows from generator armature 7 through contacts 46, contacts 32, solenoid 28, contacts 34. Solenoid 28 operates valve 24 which admits operating fluid into cylinder 22 thereby reversing the drive 14 from the position shown. Contactors 16 and 18 are thereby closed and contactor 17 is opened thereby connecting motors 12 and 13 in parallel. Movement of drive 14 opens contacts 19 thereby deenergizing solenoid 37 and releasing valve 36. Rheostat 9 is slowly returned to the position shown due to downward movement of the piston of the drive 11 and leakage through the exhaust port of valve 36 thereby reenergizing generator 7, 8. The usual constant output control of the generator raises the value of the generator current to twice the value of such current before the above changeover has taken place to maintain the motor currents at their original values as determined by the tractive effort. Relay 33 is then reenergized and opens contacts 34 thereby deenergizing solenoid 28. Relay 38 does not operate as the current does not reach the operating value of such relay but relay 39 will close its contacts as soon as the generator current exceeds the value of 0.45 I and retains its contacts in closed position, but its position no longer has any effect on the control system. Due to the action of rheostat 9 in rapidly reducing and slowly reestablishing the excitation of the generator, contactor 17 interrupts a current of small magnitude only and its size may therefore be reduced. The motors receive a reduced current during the changeover and the current slowly increases to its final value thereby avoiding the production of excessive accelerations of the vehicle.

The motors having been connected in parallel as described above, if the vehicle is driven upgrade so that the generator current will exceed the value of 1.1 I, relay 39 will have closed its contacts and relay 38 will then close contacts 41. A current will then flow from generator armature 7 to relay 43 and contacts 41 and relay 43 will close its circuit over holding contacts 44 and contacts 42. Contacts 47 are also closed and a current flows from generator armature 7 through contacts 47, contacts 21 to solenoid 37. Rheostat 9 then operates as described above and contact 48 will also be closed to maintain the circuit of relay 43 even if relay 39 opens its contacts in response to the reduction of motor current due to reduction of the voltage of generator 7, 8. Relay 33 closes contacts 34 and the current flows from generator armature 7 through contacts 47, contacts 31, solenoid 29 and contacts 34. Solenoid 29 operates valve 26 to admit operating fluid into cylinder 23 thereby returning controller 14 to the position shown thereby opening contacts 16 and 18 and closing contactor 17. Contacts 21 open thereby deenergizing solenoid 37 thereby causing generator 7, 8 to be reexcited to its operating voltage. Relay 33 opens contacts 34 thereby deenergizing solenoid 29. Relay 39 will close contacts 42 before contact 48 opens thereby maintaining the circuit of relay 43 closed and maintaining the relay in the position shown.

The embodiment shown in Fig. 2 is similar to that of Fig. 1 but differs therefrom in the following particulars. The source of supply is now assumed to be at constant voltage and is represented by a trolley line 49 from which current is collected by a current collector 51 and returned to ground as at 52. Rheostat 9 is now inserted in series with motors 12 and 13, the purpose of the rheostat being again to reduce the current in the motors during switching operations. Relays 38 and 39 are shown in the present embodiment as being connected in the circuit of motor 13 alone thereby receiving current from only one motor both during parallel and during series operation of the traction motors. Relay 39, which in the embodiment of Fig. 1 operated when the motors were connected in series, may, therefore, be adjusted for operation at a current of 0.45 I. Relay 38 which now receives the current of only one motor during parallel operation will be required to operate at 0.55 I instead of 1.1 I. In other respects the operation of the embodiment of Fig. 2 is identical to that of the embodiment shown in Fig. 1 and need not be repeated.

In vehicles provided with four or more driving motors and in which it is desired to provide series parallel operation of the motors, controller 14 will have to be provided with additional operating positions and must have associated therewith additional contactors. The operation of the controller is then similar to that described above and the additional positions of the controller are determined by additional relays similar to relays 38, 39 and 43, and additional contacts on the controller. Although the present invention has been illustrated and described as being applied to the control of the traction motors of an electrically driven vehicle, it will be understood that the invention is not to be so limited but may be applied to motor control systems in which the motors are supplied from a single source of current and are to be operated with varying loads.

Although but two embodiments of the invention have been illustrated and described, it will be apparent to those skilled in the art that various changes and modifications may be made therein without departing from the spirit of the invention or from the scope of the appended claims.

It is claimed and desired to secure by Letters Patent:

1. In a control system for electric motors, a source of electric current, a plurality of motors arranged to be differently connected with said source, a plurality of contactors for automatically changing the connection of said source with said motors to secure change from series to series-parallel and to parallel connection thereof, fluid pressure operated means for operating said contactors, a reservoir to retain fluid under pressure, valves connecting said means and said reservoir, a plurality of voltage responsive relays for controlling the operation of said valves, and a plurality of current responsive relays operable at different values of current drawn by said motors and controlling the energization of said voltage relays in response to the current flowing from said source to said motors.

2. In a control system for electric motors, a source of electric current, a plurality of motors arranged to be differently connected with said source, a plurality of main contactors for changing the connection of said source with said motors, fluid pressure operated means for operating said contactors, a reservoir to retain fluid under pressure, valves connecting said means and said reservoir, a plurality of voltage responsive relays for controlling the operation of said valves, an auxiliary contactor associated with said main contactors and connected with said relays, and a plurality of current responsive relays operable at different current values in the connections of said source with said motors, said auxiliary contactor and said current relays cooperating to control energization of said voltage relays in response to the current flowing from said source to said motors.

3. In a control system for electric motors, a source of electric current, a plurality of motors arranged to be differently connected with said source, means for automatically changing the connections of said source with said motors from series to series-parallel and to parallel and vice versa, means associated with the connections of said source and with said motors to control the operation of the first said means, fluid pressure operated means for gradually varying the voltage of said source during change of the connections thereof with said motors, a fluid pressure reservoir, and means controlled by the second said means for controlling the connection of said fluid pressure operated means with said reservoir.

4. In a control system for electric motors, a source of electric current, a plurality of motors arranged to be differently connected with said source, means for automatically changing the connections of said source with said motors from series to series-parallel to parallel and vice versa, means operable in response to potential conditions of said source to control the first said means, means for gradually decreasing the potential of said source during change of the connections therewith of said motors, and means operable at different values of current supplied to said motors to control the operation of the second and third said means.

5. In a control system for electric motors, a source of electric current, a plurality of motors arranged to be differently connected with said source, means for automatically changing the connections of said source with said motors to secure change from series to series-parallel and to parallel connection of said motors, means associated with the connection of said source and with said motors to control the operation of the first said means, means for gradually decreasing the voltage of said source prior to change of the connection thereof with said motors, and means controlled by the second said means for controlling operation of the third said means.

6. In a series-parallel control system, a plurality of continuous current electrical machines, an automatic grouping control device, comprising two electromagnetic relays having windings traversed by current proportional to the field current of the controlled machines, and armatures adapted to close control circuits for the inverse transition of the series parallel grouping of said machines, one of said relays being adapted to keep open the control circuit for parallel connection of said machines so long as the field current reaches a predetermined minimum value, and the other relay being adapted to close the control circuit for series connection of said machines when the field current reaches a predetermined maximum value.

7. In a series parallel control system for continuous current electrical machines, the combination with a plurality of such machines, of two electromagnetic relays, each comprising an armature, contacts adapted to be bridged by said armature, and an operating coil energized by current proportional to the field current of the controlled machines, one of said relays being arranged to keep its contacts open so long as the field current reaches a predetermined minimum for series grouping of said machines but to close its contacts for bringing about parallel grouping of said machines when said field current falls below said minimum, and the other of said relays being arranged to close its contacts for bringing about the said series grouping when said field current reaches a predetermined maximum for the said parallel grouping.

LEO FRANZ.